United States Patent [19]

McIntyre

[11] Patent Number: 5,193,643

[45] Date of Patent: Mar. 16, 1993

[54] NUT AND RETAINER ASSEMBLY

[75] Inventor: Kenneth A. McIntyre, Culleoka, Tenn.

[73] Assignee: Saturn Corporation, Troy, Mich.

[21] Appl. No.: 735,416

[22] Filed: Jul. 25, 1991

[51] Int. Cl.⁵ ............................................. B60K 5/12
[52] U.S. Cl. .................................. 180/312; 411/112; 411/175; 411/104
[58] Field of Search ....................... 180/312, 299, 300; 411/174, 175, 104, 111, 112, 113, 432

[56] References Cited

U.S. PATENT DOCUMENTS

| | | | |
|---|---|---|---|
| 2,409,209 | 10/1946 | Johnson | 411/111 |
| 3,093,178 | 6/1963 | Boyd | 411/181 |
| 3,426,818 | 2/1969 | Derby | 411/175 |
| 4,762,451 | 7/1988 | Collins | 411/177 |
| 4,875,816 | 10/1989 | Peterson | 411/104 |
| 5,022,804 | 6/1991 | Peterson | 411/104 |

Primary Examiner—Margaret A. Focarino
Assistant Examiner—Tamara L. Graysay
Attorney, Agent, or Firm—William A. Schuetz

[57] ABSTRACT

A nut and retainer assembly for mounting an engine cradle to a vehicle frame. The assembly has a nut with a planar base and a hub provided with a threaded opening and a one-piece, spring steel, sheet metal retainer. The retainer has an apertured planar body, a pair of U-shaped channels along its sides and a pair of spaced deflectable tabs for loosely slidably receiving and retaining the planar base of the nut so as to have limited floating movement relative to the retainer. The retainer also has a deflectable third tab and a deflectable hand to enable it to be readily detachably connected to the vehicle frame.

2 Claims, 4 Drawing Sheets

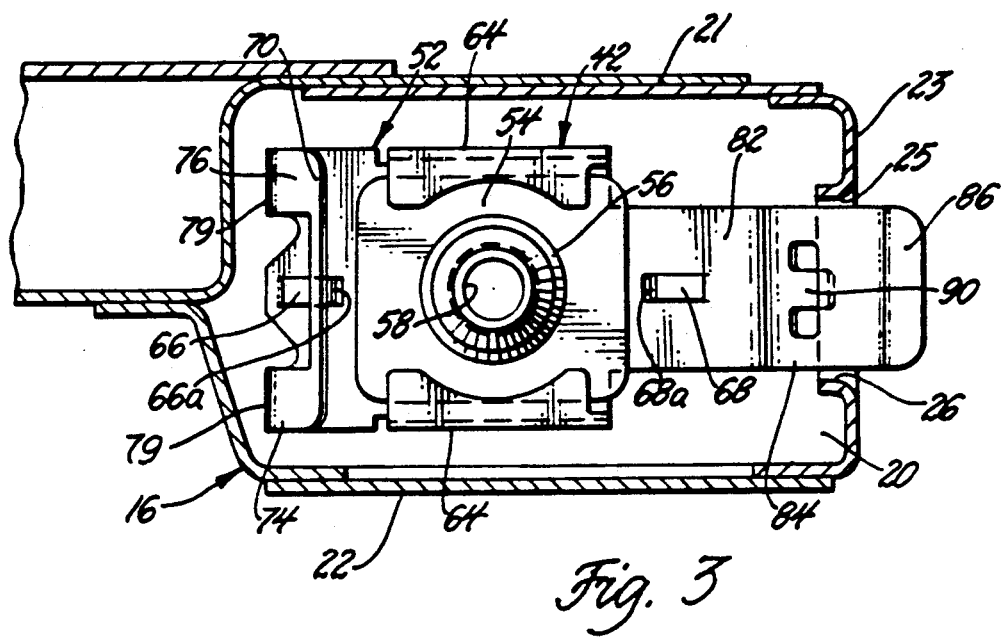

NUT AND RETAINER ASSEMBLY

The present invention relates to nut and retainer assemblies for mounting an engine and cradle assembly to a vehicle frame and, more particularly, to nut and retainer assemblies in which the nut can be readily attached to the retainer and has limited free floating movement relative thereto and in which the nut and retainer assemblies can be readily detachably connected to the vehicle frame.

It is common to mount a vehicle engine to a cradle and then mount the engine and cradle assembly to the main side frames of the vehicle via bolt and nuts. These frames usually are of a hollow, rectangular box steel construction. The side frames are provided with elongated slots at selected locations to provide access to the interior thereof for weld guns to enable the frame to be fabricated.

In accordance with the provisions of the present invention, novel nut and assemblies are provided which can be readily inserted through certain of the already provided weld gun access slots of the frame and which are provided with deflectable tabs for engaging and cooperating with abutment surfaces or stops on the frame so that the assemblies are retained in place.

The novel nut and retainer assemblies comprise a nut having a rectangularly shaped planar base and an axially extending hub provided with a threaded opening therethrough and a one piece, spring steel sheet metal retainer having a planar body portion provided with a hole therethrough. The retainer is stamped and bent to provide a pair of U-shaped channels along its sides for loosely slidably receiving opposite sides of the planar base of the nut. The planar body portion also has a first and second upwardly extending tabs at its forward and rearward ends for engaging the forward and rearward ends of the planar base of the nut. The first and/or second tabs are deflectable toward the plane of the body portion of the retainer to enable the nut to be inserted between the side channels and positioned between the first and second tabs. The nut is loosely retained between the side channels and the first and second tabs so that the nut has limited floating movement therebetween.

The retainer also has an upwardly extending deflectable third tab adjacent its forward end and a deflectable handle portion adjacent its rearward end which is provided with a lanced deflectable fourth tab. The retainer and nut assemblies are inserted through the weld access holes in the frame and then shifted downwardly toward the bottom of the frame. The third tabs on the retainers deflect when the nut and retainer assemblies are inserted and shifted until the third tabs engage an abutment surface or surfaces on the frame. Then the handle portion is then deflected inwardly and downwardly toward the bottom of the frame to cause the fourth deflectable tabs to deflect and ride over an abutment or flange along the bottom of the weld gun access hole or other hole in the frame and lock therebehind. The cradle and engine assembly is connected to the bottom of the frame by bolts which are inserted vertically upwardly through aligned holes in the cradle, frame and the body portion of the retainer and then threadably connected to the nuts.

The present invention further resides in various novel constructions and arrangement of parts, and further novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 3 is a fragmentary cross sectional view taken approximately along line 3—3 of FIG. 2;

FIG. 4 is a perspective view of the rear nut and retainer assembly shown in FIGS. 3 and 4;

Figure 1:
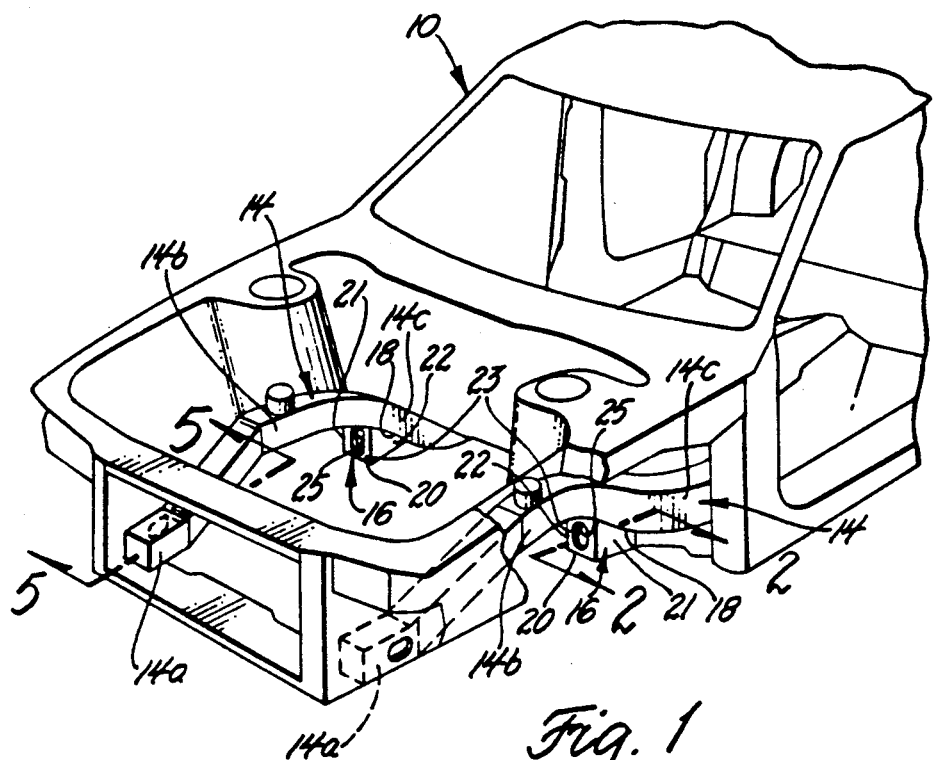
FIG. 1 is a fragmentary perspective view of a vehicle frame and illustrating the locations of the weld access holes for receiving the novel nut and retainer assemblies of the present invention.

Referring to FIG. 1 of the drawings, a vehicle body 10 is thereshown. The body 10 includes left and right support frames 14. Except for location of access openings, the left and right support frames 14 are identical. The frames 14 along the forward part of the vehicle, generally includes a forward portion 14a, a higher intermediate portion 14b adjacent to where the wheels (not shown) of the vehicle would be located and a downward sloping portion 14c. The frames 14 are of a hollow steel box construction and include a triangularly shaped support housing 16 welded to the frame portion 14c and located beneath the sloping bottom 18 of the frame portion 14c.

Figure 2:
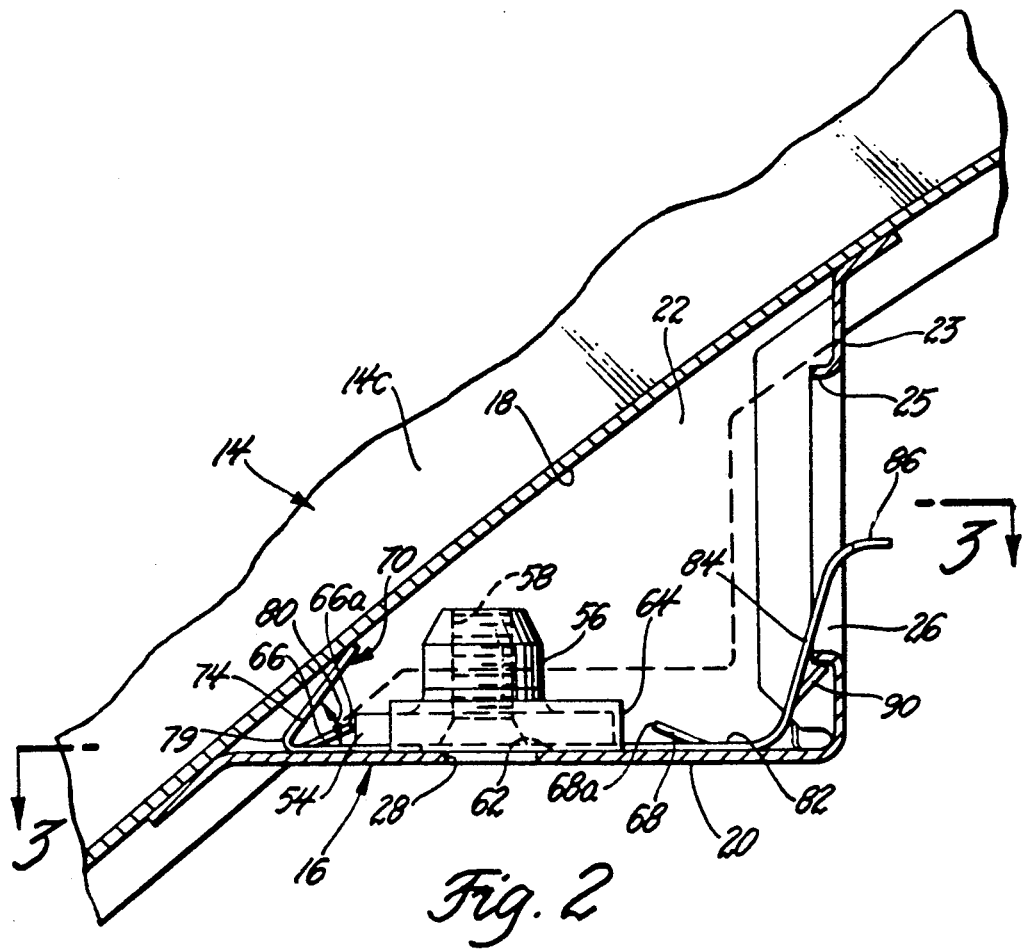
FIG. 2 is an enlarged fragmentary cross sectional view taken approximately along line 2—2 of FIG. 1 and showing the nut and retainer assembly for supporting the rear of the engine and cradle assembly.

As best shown in FIG. 2, each support housing 16 has a horizontal bottom 20, a pair of vertical side walls 21, 22 (see also FIG. 1) and a vertical end wall 23. The sloping bottom 18 of the frame portion 14c defines the top wall of the housing 16. The end wall 23 of the housing 16 has a vertically elongated slot 25 therethrough. The slot 25 is a weld gun access slot to enable a weld gun (not shown) to be inserted into the interior of the housing 16 to enable it to be welded to the frame portion 14c. The slot 25 has a horizontal lower edge defined by an inturned flange or tab 26 on the end wall 23. The bottom 20 of the housing 16 is provided with an opening 28 therethrough through which a rear mounting bolt (not shown) for the engine cradle (not shown) is to be inserted.

Figure 5:
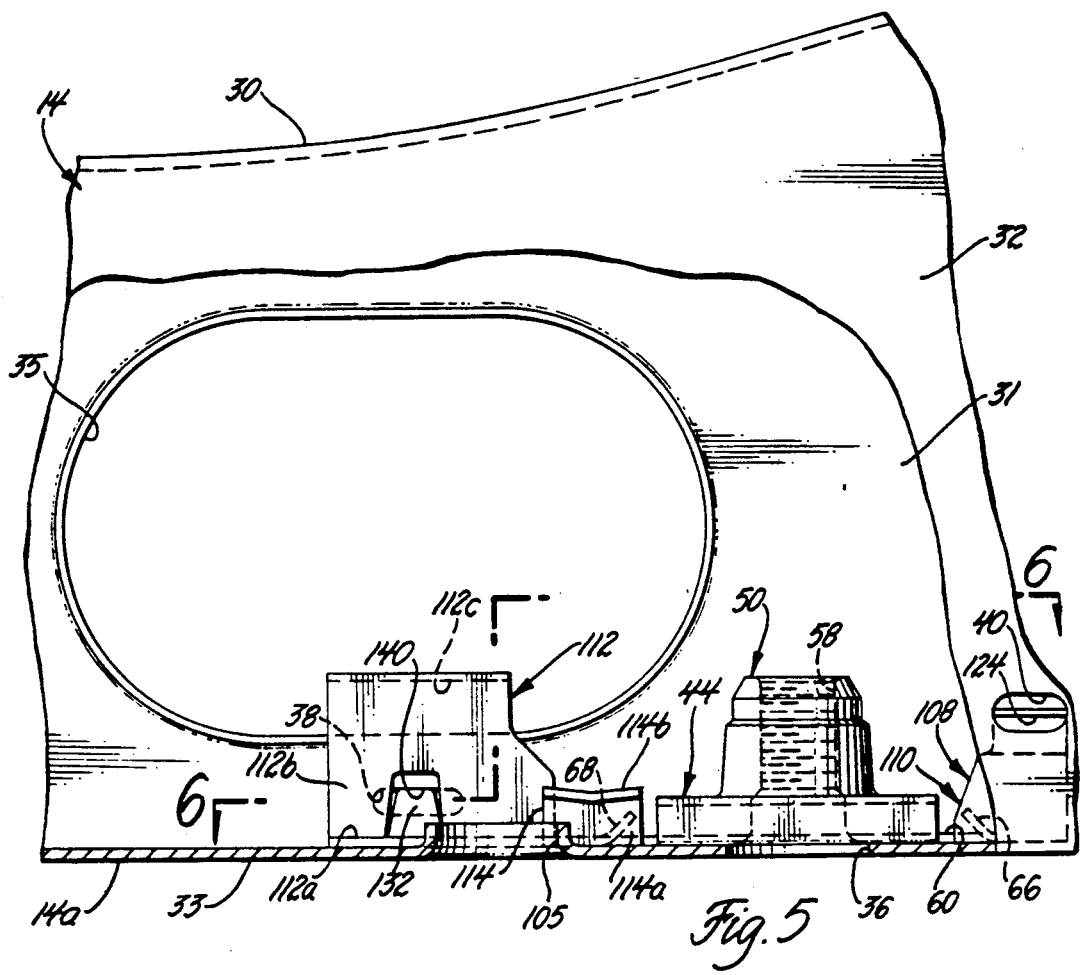
FIG. 5 is an enlarged fragmentary cross sectional view taken approximately along line 5—5 of FIG. 1 and showing the nut and retainer assembly for supporting the front of the engine and cradle assembly.

As best shown in FIG. 5, the front portion 14a of the frame 14 is rectangular in cross sectional shape and has a top 30, a pair of side walls 31, 32 and a bottom or bottom wall 33. The outer side wall 31 of the left frame portion 14a is provided with a horizontally elongated slot 35 therethrough. This slot 35 is also a weld gun access slot. The bottom 33 adjacent the slot 35 has a hole therethrough 36 through which a front mounting bolt (not shown) for the engine cradle (not shown) is to be inserted. The side wall 32 is also provided with a horizontal slot 38 located between the access hole 35 and the bottom 33 and a horizontal slot 40 located to the right of the access hole 35, and for reasons to be hereinafter described.

Figure 6:
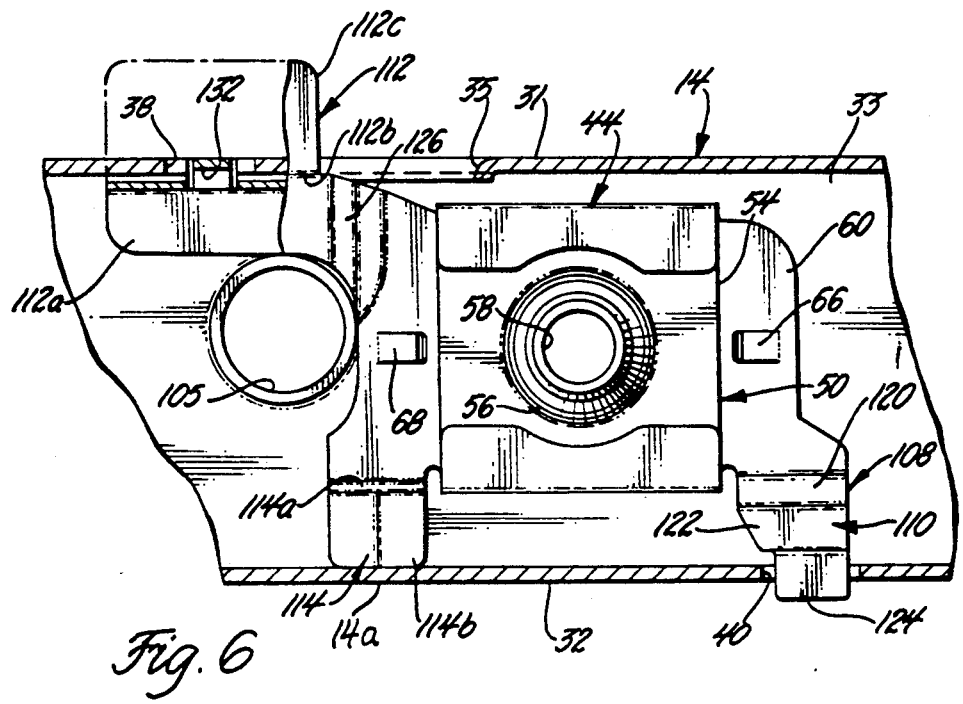
FIG. 6 is a cross sectional view taken approximately along lines 6—6 of FIG. 5.
Figure 7:
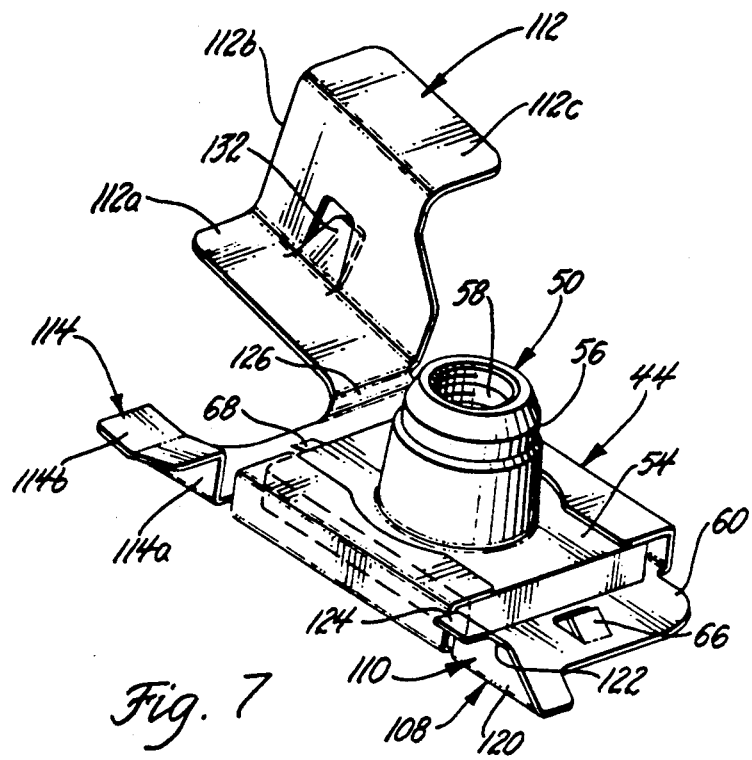
FIG. 7 is a perspective view of the front nut and retainer assembly shown in FIGS. 5 and 6.
Figure 8:
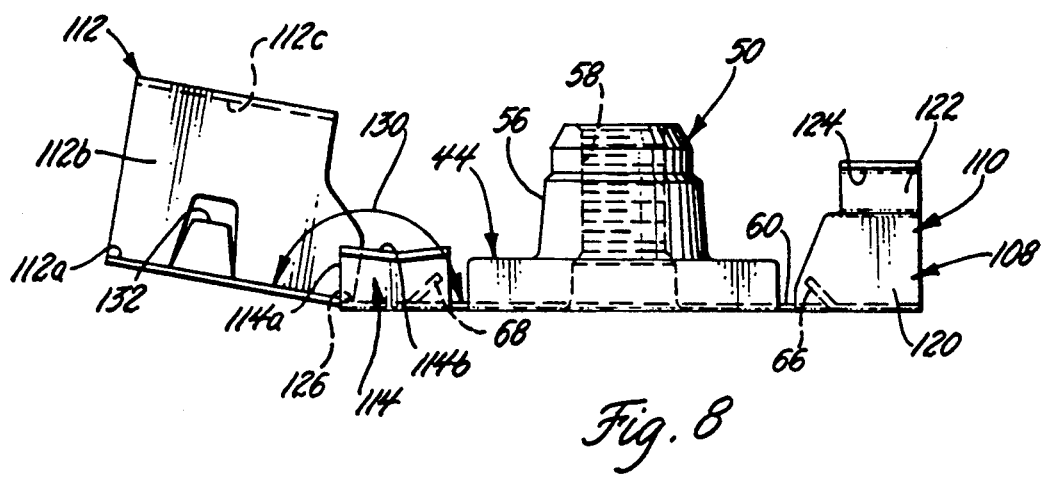
FIG. 8 is a side elevational view of the nut and retainer assembly shown in FIG. 7.

The housings 16 are each adapted to each receive a rear nut and retainer assembly 42 (see FIGS. 2-4) and the frame portions 14a are adapted to each receive a front nut and retainer assembly 44 (see FIGS. 6-8). The engine and cradle assembly (not shown) is secured to the bottom 33 of the front portions 14a and to the bottom 23 of the housings 16 via front and rear mounting bolts (not shown) and the nut and retainer assemblies 44 and 42, respectively, and in a manner to be hereinafter more fully described.

Each rear nut and retainer assembly 42 comprises a nut 50 and a one piece retainer 52 made from spring steel. The nut 50 is made from steel and comprises a rigid planar base 54 which is rectangular, preferably square, in shape and provided with rounded corners, as shown in FIG. 4. The nut 50 also includes an axially or perpendicularly extending hub or hub portion 56. The base 54 and hub 56 have a central through threaded opening 58 therethrough.

The retainer 52 comprises a one piece spring steel sheet metal retainer having a planar main body or body portion 60 provided with a hole 62 therethrough which has a larger diameter than the threaded opening 58 in the nut 50. The body portion 60 of the retainer 52 is stamped and bent to define a pair of generally U-shaped channels 64 along its opposite sides which face toward each other for loosely, slidably receiving opposite sides of the planar base 54 of the nut, as clearly sown in FIGS. 2-4 of the drawings. The body portion 60 of the retainer 52 also has a first lanced upstruck linear tab 66 adjacent its forward end and a second lanced upstruck linear tab 68 adjacent its rearward end. The tabs 66 and 68 are deflectable and their upper or free ends 66a and 68a are adapted to engage the forward and rearward sides of the planar base 54 of the nut 50.

The nut 50 is attached to the retainer 52 by aligning the planar base 54 with the channels 64 and deflecting one of the tabs 66 o 68 downwardly toward the plane of the body portion 60 of the retainer 52 and then sliding the base 54 of the nut 50 longitudinally of the retainer 52 until the base 54 engages the upstruck other tab 66 or 68. When the base 54 clears the tab 66, 68 which was deflected the tab will return to its normal free state position and be engageable with the adjacent side of the base 54 of the nut 50. The transverse distances between the free ends of the tabs 66, 68 and the bottoms of the channels 64 is greater than the corresponding transverse dimensions of the base 54 of the nut 50 so that the nut 50 has limited floating movement between the tabs 66, 68 and side channels 64.

The retainer 52 shown in FIGS. 1-4, also includes a third deflectable tab 70 at its forward end and a handle or handle portion 72 at its rearward end. The third tab 70 is of an inverted U-shape and is bent upwardly and toward the rearward end of the body portion 60. The tab 70 includes a pair of spaced end legs 74, 76 and a cross bar 78. The legs 74, 76 define a radiused bight 79 at their juncture with the forward end of the body portion 60. The tab 70 when bent upwardly and toward the rearward end of the body portion 60 forms an acute included angle 80 with the plane of the body portion.

The handle 72 is integral with the body portion at its rearward end and includes a flat horizontal section 82, a generally upwardly, vertically extending intermediate section 84 and a generally horizontally extending upper end section 86. The sections 82, 84 and 84, 86 at their respective junctures are radiused so that the handle 72 can be flexed toward and from the nut 50. The upwardly extending vertical portion 84 has lanced outwardly extending fourth tab 90.

The nut and retainer assembly 42 is connectable to the housing 16 by grasping the handle 72 and inserting the same sideways through the opening 25 in the end wall 23 and then turning the same so that the retainer and nut assembly 42 will be right side up. The third tab 70 is deflectable upon engagement with the sloping wall 18 of the housing 16 until the bights 79 of the tab 70 engages both the sloping wall 18 and the bottom 20 at its juncture 92 with the sloping top wall 18. Thereafter, the handle 72 and the nut and retainer assembly 42 is pushed or moved downwardly and with the vertically extending handle portion 84 deflecting inwardly of the housing 16 or toward the left, as viewed in FIG. 2. The tab 90 is deflected toward the left by the inturned flange 26 at the bottom of the opening 25 until the nut and retainer assembly 42 is in contact with the bottom wall 20 of the housing 16. When this occurs, the tab 90 will have ridden over the inturned flange 26 and then moved toward the right due to its self biasing forces to lock itself underneath the flange 26 as shown in FIG. 2. The width of the nut and retainer assembly 42 is such that it is only slightly less than the width between the side walls 21, 22 of the housing 16 so that it only laterally shifts therebetween a limited amount. The tab 90 on the handle 72 of the retainer 52 is held in its locked position by the biasing action of the third tab 70 engaging the sloping wall 18 at the juncture 92 of the housing 16. The spring bias of the tab 70 also provides an anti-rattle function.

When the nut and retainer assembly 42 is connected to the housing 16, the nut 50 will be disposed above the opening 28 in the bottom wall 20 of the housing 16 so that an engine and cradle assembly (not shown) can be mounted against the bottom wall 20 and held in place via a bolt (not shown) inserted through the openings 28 and 62 and then threadably connected to the nut 50.

FIGS. 5-8 show the front nut and retainer assembly 44 which is adapted to be inserted through the front weld gun opening 35 of the vehicle side frame 14 to form a mount for the engine and cradle assembly adjacent the front end of the vehicle. The side frame 14 is generally rectangular in shape and has the bolt access through opening 36 through its bottom wall 33 and the slot 40 in the opposite side wall 32 from the wall 31 containing the slots 35 and 38. The bottom wall 33 of the frame portion 14a also contains a through opening 105 surrounded by an inturned flange adjacent the side slot. This opening 105 is provided for other manufacturing reasons in processing the frame.

The nut and retainer assembly 44 is substantially identical to the nut and retainer assembly 42 except that it employs a different retainer 108. The retainer 108 differs from the retainer 52 in that it contains a third tab 110 adjacent its forward end which is different from the tab 70 of the retainer 52, is provided with a somewhat different handle 112 from the handle 72 of the retainer 52 and that it includes an abutment flange 114 adjacent its rear end. In all other respects the nut and retainer assembly 44 is substantially identical in construction to the nut and retainer assembly 42, and corresponding parts have been given the same reference numerals. The manner in which the nut 50 is retained on the retainer 108 is identical to the manner previously described with respect to the nut and retainer assembly 42.

The third tab 110 is integral with the side of the body portion 60 of the retainer 108 adjacent its forward end and extends laterally outwardly therefrom. It includes an upwardly extending portion 120, a second portion 122 bent with respect to the upwardly extending portion 120 and a generally horizontally disposed portion 124. The tab 110 is flexible toward and away from the body portion 60.

The abutment flange 114 comprises an upwardly extending portion 114a integral with the side of the body portion 60 of the retainer 108 adjacent its rearward end and a generally horizontally disposed portion 114b. The abutment 114 extends laterally outwardly from the same side of the body portion 60 as the third tab 110. The handle 112 is formed integral with the rearward end of the body portion 60 of the retainer 108 and includes a first section 112a integrally hinged with the main body portion at 126 and which forms an obtuse included angle 130 with the plane of the body portion 60. It further includes an upwardly or vertically extending section 112b and an outwardly extending flange or section 112c. The vertically extending portion 112b includes a fourth lanced deflectable tab 132 which extends outwardly therefrom.

The nut and retainer assembly 44 is secured within the hollow frame 14 by inserting the same through the elongated slot 35 and shifting the same horizontally or longitudinally of the frame. The third deflectable tab 110 is deflected by the side wall 32 of the frame portion 14a when the retainer 108 is shifted horizontally, toward the right, as shown in FIG. 5. This horizontal shifting movement of the retainer 108 occurs while the third deflectable tab 110 rides on the side wall 32 until it is located adjacent the slot 40. When located adjacent thereto, the spring bias of the tab 110 will cause it to move outwardly through the slot 40 to lock the retainer 108 from further horizontal shifting movement. Then the handle portion 112 of the retainer 108 is moved downwardly about its hinge 126 and with the deflectable tab 132 being deflected as it engages and rides over the side wall 32. When the fourth tab 132 is located at the slot 38 in the side wall 31, it will spring outwardly and hook underneath the horizontal upper surface 140 on the wall 31 defining the upper side edge of the slot 38 and thereby hold the handle 112 in place. The abutment flange 114 engages the side wall 32 of the frame portion 14a after the handle 112 is locked in place so as to prevent shifting or rattling movement of the nut and retainer assembly 44 within the hollow frame 14. Note that the nut and retainer assembly 44 also clears the inturned flange of the opening 105 and that its rear end is disposed to the right of the opening, as shown in FIG. 5, which aids in further retaining the nut and retainer assembly 44 in place.

When the nut and retainer assembly 44 is in place, the nut 50 will be aligned with the opening 36 in the bottom 33 of the frame 14 so that when the cradle and engine assembly (not shown) is mounted against the bottom 33, a bolt (not shown) can be passed through the openings 36, 62 and be threadably connected with the nut 50 to hold the engine and cradle assembly in place against the bottom 33.

From the foregoing, it should be apparent that novel nut and retainer assemblies have been provided which can be readily detachably connected within hollow frame portions or housings of a hollow frame and which are resiliently held in place without the need for any additional fasteners to hold any nut and retainer assembly in place. The nut and retainer assemblies are of a relatively simple design, can be readily connected in place, have limited floating movement, and with the nut also having limited floating movement relative to the retainer so that the bolts for the engine and cradle assembly can be readily connected in place.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. In an automotive vehicle having a hollow support frame including bottom and side walls, an engine and cradle assembly and a nut and retainer assembly carried by said bottom wall of said side frame and disposed above an opening therethrough, said cradle and engine assembly being connected to said frame via bolts inserted through said openings in said bottom wall and threadably engaging said nut, the improvement being that said nut and retainer assembly comprises a nut having a generally rectangular shaped planar base and an axially extending hub provided with a threaded opening therethrough, a one piece, spring steel sheet metal retainer having a planar body portion provided with a hole therethrough which has a larger diameter than said threaded opening in said nut, said sheet metal retainer being stamped and bent to provide a pair of generally U-shaped channels along its sides for loosely slidably receiving opposite sides of said planar base of said nut, a first upwardly extending tab at its forward end for engaging said planar base of said nut and a second upwardly extending tab for engaging said planar base at its rearward end, one of said first and second tabs being deflectable from its normal free state position toward the plane of said body portion to enable said planar base of said nut to be inserted between said side channels and being returnable toward its free state position upon the planar base of the nut being positioned between said first and second tabs whereby said nut is loosely retained between said side channels and said first and second tabs in a manner such that it has limited floating movement between the side channels and the first and second tabs, a third upwardly and laterally outwardly extending, deflectable tab on one side of said body portion adjacent its forward end and a deflectable upwardly and laterally outwardly extending handle portion on said body portion adjacent its rearward end and its side opposite said one side, said handle portion having a lanced deflectable fourth tab, said frame adjacent said through opening in its bottom wall having a first slot in one side wall for insertion of said nut and retainer assembly, said frame portion having a second slot in its opposite side wall whose side edges define first abutment surface for engaging said third tab, said frame having a second abutment means adjacent said slot along its bottom edge which is engageable by said fourth tab, said nut and retainer assembly being connectable to said frame by inserting and longitudinally shifting the same through said slot, said third tab engaging said opposite side wall of said frame and being deflected when said nut and retainer assembly is inserted through and longitudinally shifted of said slot until said third tab snaps through and is engageable with a side edge of said second slot on said frame, said handle portion then being deflectable inwardly and downwardly of said frame until said fourth deflectable tab on said handle portion rides over said second abutment means and locks therebehind.

2. In an automotive vehicle as defined in claim 1, and wherein said retainer on said one side of said body portion at said rearward end has a laterally outwardly extending about which engages said opposite side wall of said frame to prevent rattling of said retainer assembly when the latter is connected to said frame.

* * * * *